United States Patent [19]

Richter

[11] Patent Number: 4,827,791

[45] Date of Patent: May 9, 1989

[54] ROBOT ARM

[75] Inventor: Hans Richter, Augsburg, Fed. Rep. of Germany

[73] Assignee: Blomberg Robotertechnik GmbH, Ahlen, Fed. Rep. of Germany

[21] Appl. No.: 110,220

[22] Filed: Oct. 13, 1987

Related U.S. Application Data

[62] Division of Ser. No. 622,242, Jun. 19, 1984, Pat. No. 4,708,578.

[30] Foreign Application Priority Data

Jun. 21, 1983 [DE]  Fed. Rep. of Germany ....... 3322199

[51] Int. Cl.$^4$ ..................... B25J 18/00; G05G 11/00
[52] U.S. Cl. ......................................... 74/469; 74/479
[58] Field of Search .................. 74/469, 479; 16/1 C; 248/292.1; 901/21, 48; 414/7

[56] References Cited

U.S. PATENT DOCUMENTS

| 3,449,769 | 6/1969 | Mizen | 272/93 X |
| 4,442,387 | 4/1984 | Lindbom | 901/48 |
| 4,500,251 | 2/1985 | Kiryu et al. | 414/7 X |

Primary Examiner—Allan D. Herrmann
Attorney, Agent, or Firm—Pascal & Associates

[57] ABSTRACT

A robot arm consisting of an upper arm link and a lower arm link which are interconnected by a uniaxial joint. The upper arm link is connected with a structure via a universal joint. In order to attain a weight balance, a bellcrank level is placed on the upper arm link, on whose one lever arm an upwardly directed equalizing force acts and whose other lever arm is connected to the lower arm link. If both arm links are in alignment with one another, then the point of application of force on the one lever arm has its greatest distance to the universal joint. If, on the other hand, the lower arm link is swung out of its alignment with the upper arm link, then the distance between the point of application of force and the universal joint is decreased.

18 Claims, 4 Drawing Sheets

ROBOT ARM

This is a division of application Ser. No. 622,242, filed June 19, 1984, now U.S. Pat. No. 4,708,578.

The present invention relates to a robot arm made out of several links which are interconnected by hinges, whereby each joint is allotted a drive mechanism consisting of an upper arm link, which is connected with a structure via a universal joint, as well as a lower arm link, which is connected with the upper arm link via a uniaxial joint.

A prosthesis for amplifying arm strengths can be derived from U.S. Pat. No. 3,449,769 which consists of an upper arm link, a lower arm link and a hand link. The upper arm link is connected with a structure via a universal joint. The upper arm link contains a swivel joint with which it is possible to reciprocally rotate both parts of the upper arm link. The upper arm link is connected via a uniaxial joint with the lower arm link, which also has a swivel joint like the upper arm link. Each joint is allotted a drive mechanism.

A prosthesis of this type can be applied to the arm of a robot. With such an arm, it is possible to conduct movements corresponding to a human arm.

Such a robot arm is, however, in order to be sufficiently rigid and to be able to manipulate heavier loads, considerably heavy. Thus, with robot arms, one always endeavours to balance their dead weight. A balance of weight results in that the drive mechanisms must essentially only be constructed for handling loads, that is, the dead weights of the individual links of the robot arm must not—or only negligibly—be required to be considered when constructing drive mechanisms. Weight equalizations lead to the additional advantage that movements of the robot arm can be more easily programmed, since the hand link of the robot arm can be manually directed relatively easily for programming by the operator along the desired path line which this hand link is to carry out later.

The object of the invention is to develop the robot arm of the above mentioned type in such a way that an extensive balance of weight is possible with the individual links of the robot arm.

A preferred embodiment of the invention is a robot arm formed of several links. Hinges interconnect the links to form joints. An actuating mechanism comprised of a universal joint connects an upper link (the latter forming an upper arm link) to a support structure. A uniaxial joint connects the upper arm link to a lower link, the latter forming a lower arm link. An extendible lever is hinged to a part of the upper arm link which is connected to the universal joint. The lever is pivoted and rotatable about a swivel axis to a part of the swivel joint connected to the universal joint, the swivel axis of the lever being rotatable about an axis which extends perpendicularly to the swivel axis and parallel to the longitudinal axis of the upper arm link. The swivel axis is rotated about this axis when the part of the swivel joint which is connected to the lower arm link is turned, whereby the swivel axis is maintained parallel to the axis of the uniaxial joint in every swivel position. A toothed rack is movable along the upper arm link and is engaged with a gear ring segment which, together with the lower arm link, can be rotated about the axis of the uniaxial joint, the lever being rotatable about a swivel axis by means of the rack.

An embodiment of the invention is described in the following description with reference to the drawings, which:

Figure 1:
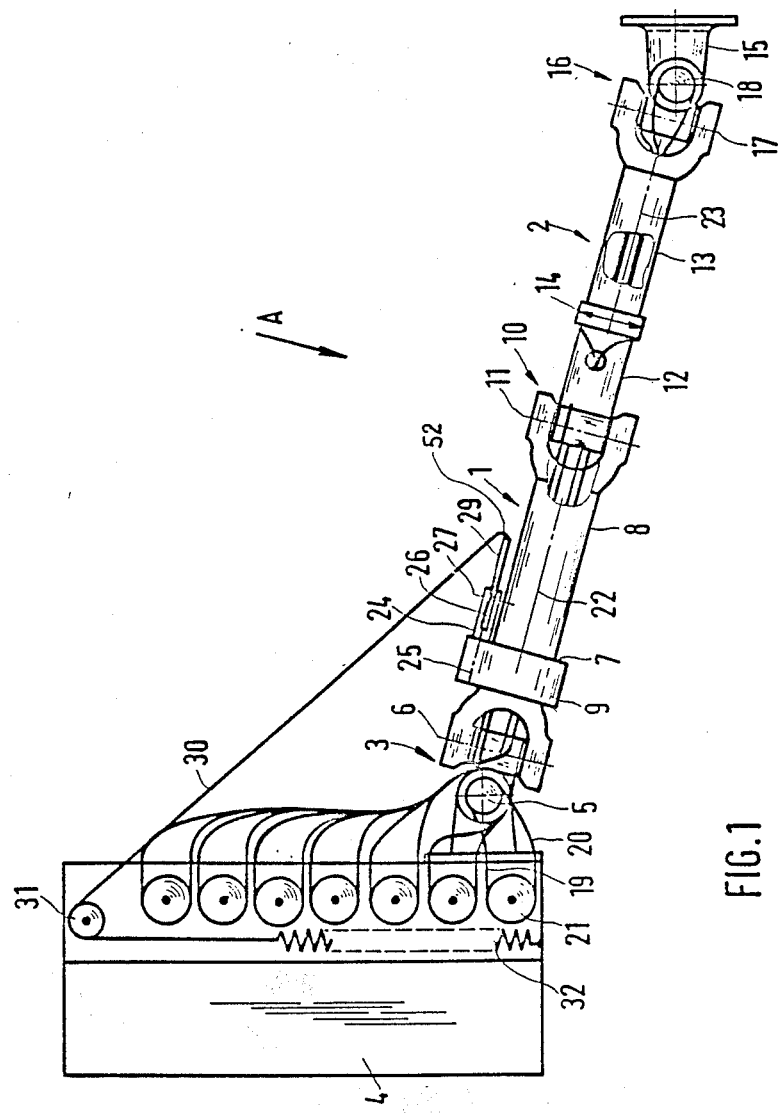
FIG. 1 is a side view of the robot arm with axes which are in alignment with one another, of lower and upper arm links in a first swivel position of the lower arm link.

The robot arm consists of an upper arm link 1 and a lower arm link 2. The upper arm link 1 is connected to a supporting structure 4 via a universal joint 3. The universal joint 3 has a horizontal swivel joint 5 and a swivel joint 6, which extends at right angles to it. The upper arm link 1 has, furthermore, a swivel joint 7, with which it is possible to rotate part 8 of the upper arm link 1 around the longitudinal axis 22 of the upper arm link 1 relative to part 9 of the upper arm link 1 which is connected with the universal joint 3.

Part 8 of the upper arm link 1 is connected to the lower arm link 2 via a joint 10, which only has one joint axis 11. This type of joint is referred to as "uniaxial".

The lower arm link, in turn, consists of two parts 12, 13 which are interconnected via a further swivel joint 14, so that part 13 can be rotated around the longitudinal axis 23 of the lower arm link 2 relative to part 12 which is connected with joint 10. Part 13 of the lower arm 2 is connected with hand 15 via a further universal joint 16, which has two joint axes 17, 18 extending at rights angles to one another.

The robot arm has, therefore, a total of seven axes, namely, axes 5, 6, 11, 17, 18, 22, 23. A drive mechanism is allotted to each of these axes. The drive mechanisms comprise two Bowden wires for each axis, for example, Bowden wires 19, 20 for axis 5 which are connected with an actuating motor 21.

The longitudinal axis of the upper arm is designated with 22 and the longitudinal axis of the lower arm with 23.

In the position illustrated in FIG. 1, the longitudinal axes 22, 23 are in alignment with one another. Axis 11 extends hereby at right angles to axis 5. The dead weights of upper arm 1 and lower arm 2 produce a torque in clockwise direction about axis 5.

A shaft 24, whose axis of rotation is parallel to the longitudinal axis 22, is pivoted on part 9 which is connected to the universal joint 3. This axis of rotation is designated with 25. This shaft 24 supports a bellcrank lever 26, whose swivel axis is designated with 27. This swivel axis 27 extends at right angles to the axis of rotation 25. The bellcrank lever 26 consists of two lever arms 28, 29 which extend at right angles to one another. At the outer end of the lever arm 29, a cable line 30 is fastened which is connected via a guide pulley 31 to structure 4 with an end of a tension spring 32 whose other end is connected with structure 4.

A cable line 33, which is fastened with an arm of bellcrank lever 34, is fastened to the other lever arm 28 of the bellcrank lever 26. This toggle lever 34 is supported at the front end of part 8 of upper arm link 1, whereby the bearing axis is designated with 35. This bearing axis 35 extends parallel to axis 11 of the joint 10. The additional arm of the further bellcrank lever 34 is connected via a further cable line 36 with the back end of the lower arm link 2, whereby the juncture 37 is spaced from the axis 11.

As already mentioned above, the upper and lower arm link 1, 2 exert a torque in clockwise direction about axis 5 with the position according to FIG. 1. Axis 11 hereby extends at rights angles to the axis 5. The swivel axis 27 of the bellcrank lever 26 is parallel to axis 11. The torque exerted by arms 1, 2 about axis 5, which acts in clockwise direction, is equalized by the moment exerted via spring 32 about axis 5, which acts in counterclockwise direction. If the upper arm link is rotated about axis 6, then these torque ratios do not change. If the upper arm link 1 is turned about axis 5 downward from the position shown in FIG. 1, then the torque about axis 5, which exists as a result of the dead weights, decreases, acting in clockwise direction. Since, with this rotating motion about axis 5, the horizontal distance between axis 5 and the hinge 52 of cable line 30 on lever arm 29 is reduced at the same time, the countermoment about axis 5 is also simultaneously decreased, whereby the weight balancing is attained. It is hereby presupposed that a constant force acts on the cable line 30. This is given when spring 32 is replaced by a counterweight.

With the above described movements, the position of the bellcrank lever 26 does not change, that is, its swivel axis 27 always extends at right angles to axis 5 and its lower arm 29 parallel to axis 22.

Figure 2:
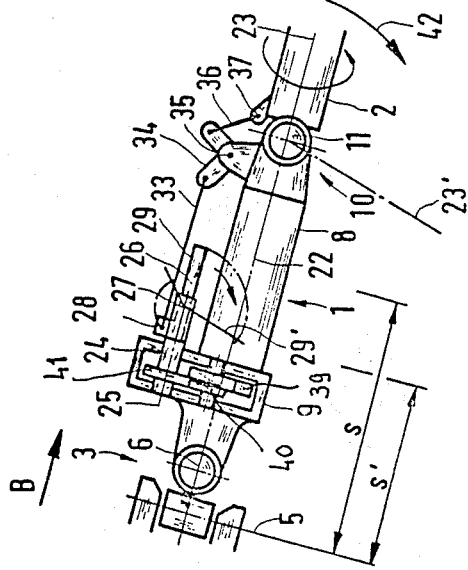
FIG. 2 is a top view of the upper arm link in the direction of arrow A in FIG. 1, in the position of the links illustrated therein.

Let us now suppose that the lower arm link 2 is rotated about axis 11. It is hereby assumed that axis 11, as before, extends at right angles to axis 5. FIG. 2 indicates that lower arm link 2 was rotated about axis 11 by more than 90°. The longitudinal axis 23 then takes position 23'. Since the centre of mass of the lower arm link 2 now has a shorter horizontal distance to axis 5, the torque acting about axis 5 in clockwise direction has consequently also been reduced. The rotating motion of the longitudinal axis 23 into position 23' results in that bellcrank lever 26 is also rotated in such a way that its lever arm 29 now assumes position 29', whereby its free end now has a shorter horizontal distance to axis 5 than before (S to S'). The shorter horizontal distance results in a decrease of the countermoment acting about axis 5. If, therefore, lower arm link 2 is rotated about axis 11 from the position shown in FIGS. 1 and 2 (position 23'), then the torque of the lower arm link 2, which acts about axis 5 in clockwise direction, is hereby reduced, at the same time, however, the countermoment is also reduced since the outer end of the lever arm 29 now has a shorter horizontal distance S' (position 29') to axis 5. The preceding is true for every position of the upper arm link about axes 5 and 6.

Figure 4:
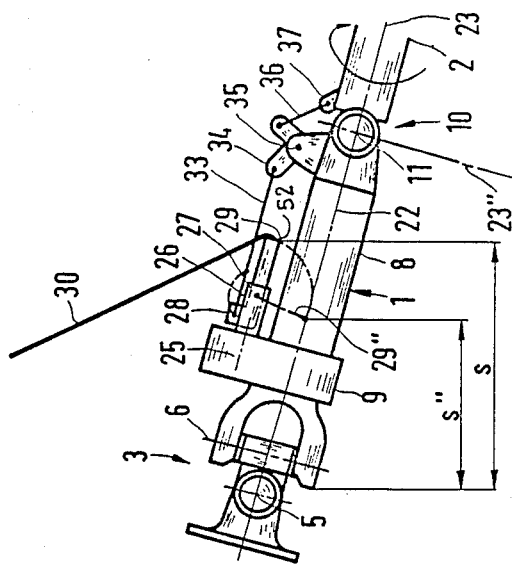
FIG. 4 is a side view corresponding to FIG. 1 in a second swivel position of the lower arm link, turned by 90° vis-à-vis FIG. 1.

Next, we shall deal with the situation in which part 8 of the upper arm link is turned about the axis of rotation 7 vis-à-vis part 9. Axis 11 then no longer extends at right angles to axis 5. In FIG. 4, part 8 is turned by 90° in comparison to the position in FIG. 1. Axis 11 then extends parallel to axis 5.

Axis 11 now extends horizontally about axes 5, 6 in all positions of the upper arm link 1. In order to also attain an equalizing of weight here, shaft 24, which supports bellcrank lever 26, is turned in the same direction and by the same angle about axis 25 as part 8 is rotated about the longitudinal axis 22, in such a way that the swivel axis 27 of the bellcrank lever 26 is always parallel to axis 11. With the position shown in FIG. 4, the swivel axis 27, therefore, also extends horizontally. The torque acting in clockwise direction about axis 11 as a result of the dead weight of lower arm link 2 is thus balanced by a countermoment in counterclockwise direction about axis 11, which acts by cable 30 via bellcrank lever 26, cable 33 to the further bellcrank lever 34 and cable 36 at the hinge 37. The dead weight of the upper arm 1, which acts as torque in clockwise direction about axis 5, is balanced by the force acting upward on axis 27.

In accordance with FIG. 4, longitudinal axes 22, 23 are in alignment with one another.

FIG. 4 also shows the situation whereby the lower arm link 2 is turned downward by 90°, that is, the longitudinal axis 23 assumes position 23". The torque produced by lower arm link 2 as a result of its dead weight in clockwise direction thus lessens. As already described in connection with FIGS. 1 and 2, the bellcrank lever 26 is also rotated by a corresponding angle into position 26" when turned into position 23", whereby the front end of the lever arm 29 ha a shorter horizontal distance S" to axis 5, so that the countermoment in counterclockwise direction is now also reduced.

In the preceding, extreme positions were described. There is also a complete balancing of weight in the respective intermediate positions.

Figure 3:
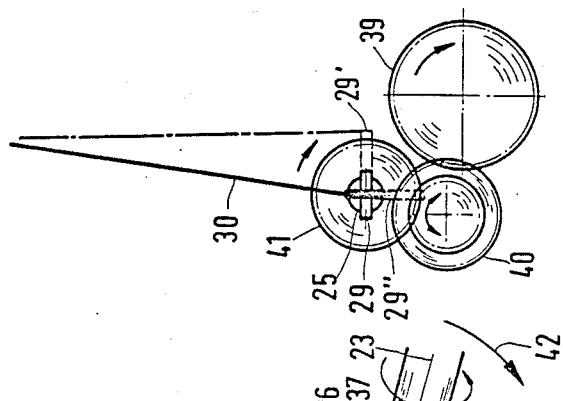
FIG. 3 is a view in the direction of arrow B of FIG. 2.

The transposition of the rotary motion of part 8 into a corresponding rotation of shaft 24 results by means of a gear unit which is illustrated in FIG. 3. Gear wheel 39 turns together with part 8. This gear wheel 39 meshes with a double gear wheel 40 which, in turn, meshes with a further gear wheel 41 on which shaft 24 is arranged. The various positions which the bellcrank lever 26 assumes in the above described positions are also illustrated in FIG. 3.

The position of the lever arm 29, when axes 22, 23 are in alignment with one another and axis 11 extends at rights angles to axis 5, is illustrated with a solid line and designated with 29. The position of the lever arm 29, when axis 11 is at right angles to axis 5, however, lower arm link 2 is turned about axis 11 (position 23'), is shown with a dot-dash line and designated with 29'.

Shown completely in black is the position of lever arm 29 for the position illustrated in FIG. 4, in which longitudinal axes 22, 23 are in alignment with one another and axis 11 is parallel to axis 5. The position of lever arm 29, when axes 5, 11 are parallel to one another and lower arm link 2 is turned upward about axis 11 by 90° and the longitudinal axis 23 consequently assumes position 23", is designated with 29".

The upper arm link 1 and lower arm link 2 are interconnected by means of joint 10, which can also be called an elbow joint. Both arm links 1, 2 can be turned just as the upper arm and lower arm of a human arm. The hinge 37 is hereby positioned on the outside of the elbow.

If the cable lines 33, 36 are replaced by bars, then the lower arm link 2 can also be turned in opposite direction to arrow 42.

The universal joints 3, 16 can also be replaced by ball-and-socket joints.

By using Bowden wires, such as Bowden wires 19, 20 for joint axis 5 and the arrangement of the actuating motors as, for example, actuating motor 21 in structure 4, a light construction is attained, since the relatively heavy actuating motors are no longer arranged directly on the joint axes.

Figure 5:
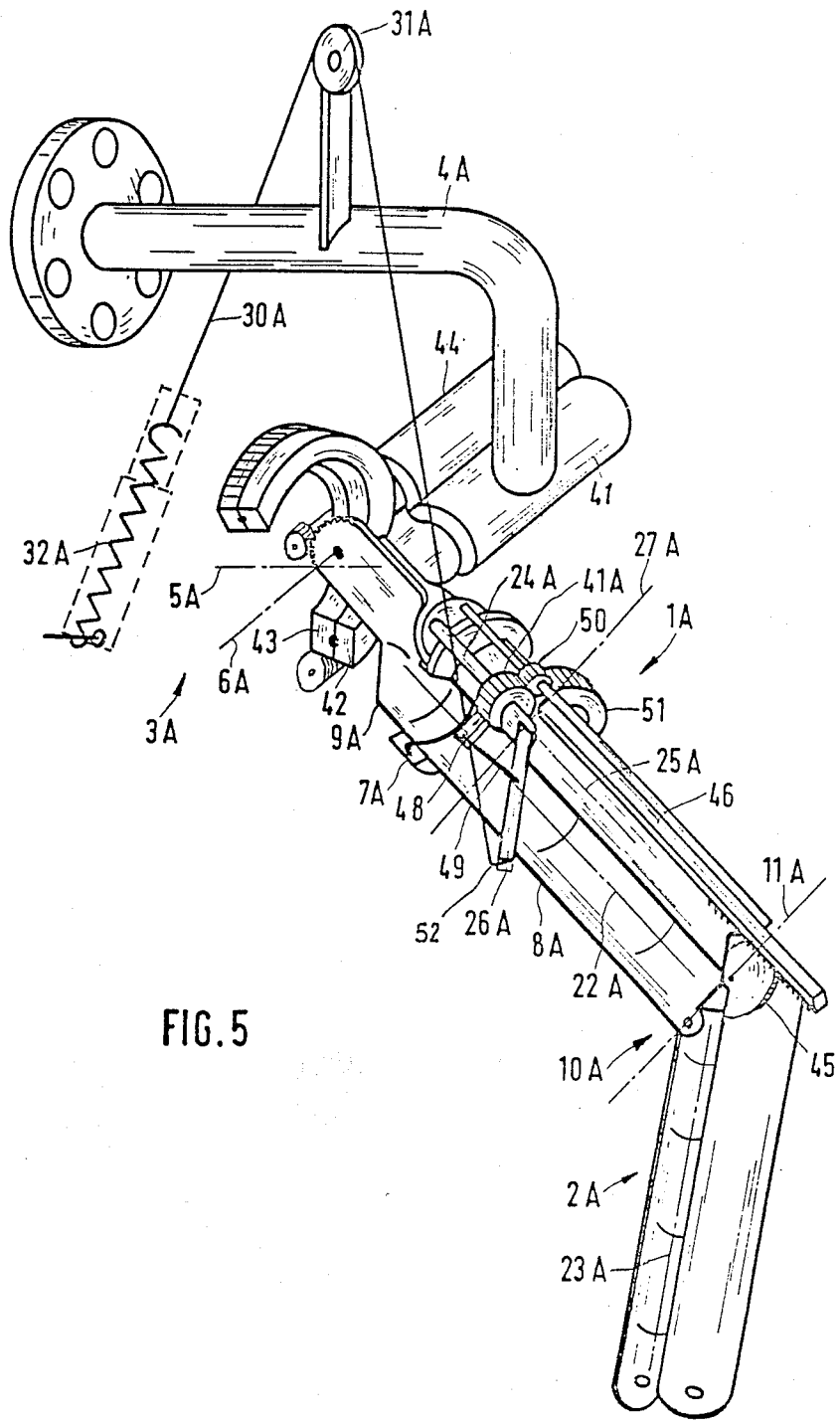
FIG. 5 is a further embodiment in perspective view and FIG. 6 is a detail of the mounting of the rocking lever of FIG. 5 on its shaft.
Figure 6:
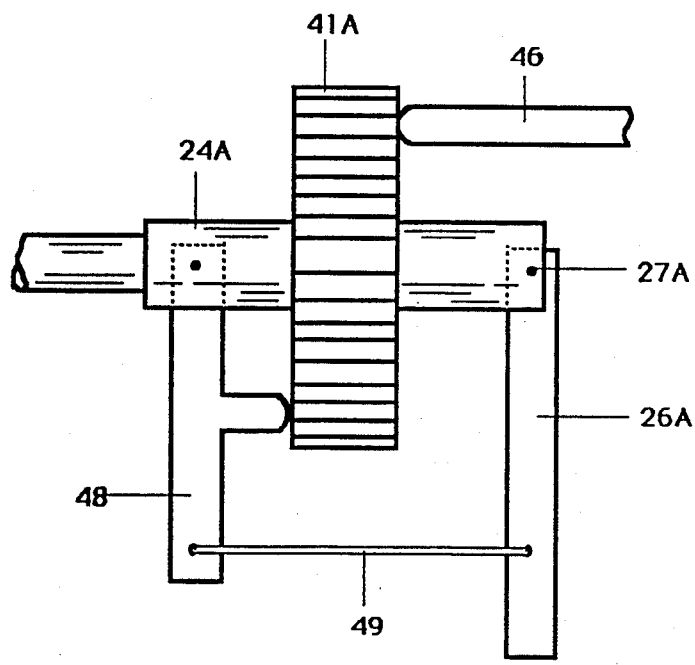

With the embodiment according to FIGS. 5 and 6, the parts corresponding to the first embodiment are provided with the same reference number, followed by the letter A.

The structure 4A supports a motor 41, which is rigidly connected with a swivel 42, opposite which another swivel 43 can be turned about axis 5A when the motor 41 is operated. A further motor 44 is flanged to the other swivel 43 and thus rotatable with it; when said motor is operated, part 9A of upper arm link 1A can be turned about axis 6A.

A gear wheel segment 45, whose axis coincides with axis 11A, is fastened to lower arm link 2A. Said gear wheel segment is engaged with a toothed rack 46 which is parallel to axis 22A of upper arm link 1A. If lower arm link 2A is rotated about axis 11A relative to part 8A of upper arm link 1A, then gear wheel segment 45 moves toothed rack 46 parallel to axis 22A.

Shaft 24A is pivoted about axis 25A on upper arm link 9A. This shaft 24A fixedly supports gear wheel 41A and, at its front end, lever 26A which can be rotated about axis 27A. The gear wheel 41A is mounted axially slidable on shaft 24A (parallel to axis 22A). Shaft 24A has a further rocking lever 48 which can be rotated about an axis parallel to axis 27A and which is adjacent to gear wheel 41A. It is connected with lever 26A by a short cable 49. The distance between the fastening point of cable 49 and axis 27A hereby corresponds to lever arm 28, whereas the distance between the fastening point of cable line 30A and axis 27A corresponds to lever 29.

If the toothed rack 46 is axially shifted, then this toothed rack 46, in turn, axially shifts gear wheel 41A on shaft 24A. This is accomplished by placing the front end of the toothed rack 46, which is not illustrated, against gear wheel 41A. With an axial shifting of gear wheel 41A on shaft 24A, rocking lever 48 is turned and therewith also lever 26A. A swivelling of lower arm link 2A, therefore, causes a corresponding movement of lever 26A. If, therefore, axes 22A and 23A are in alignment with one another, then lever 26A extends in the alignment of axis 25A of shaft 24A.

At upper arm part 9A, a pinion 50 is pivoted which engages with gear wheel 41A and which can be axially shifted with this gear wheel by toothed rack 46. This pinion 50, moreover, engages with gear wheel segment 51, which is fixedly fastened to upper arm part 8A, which can, nevertheless, also be axially shifted by toothed rack 46.

If the upper arm part 8A is turned about the swivel joint 7A relative to upper arm part 9A about axis 22A, then this rotary motion is transmitted by the gear wheel segment 51 via pinion 50 onto gear wheel 41A, whereby shaft 24A is turned about axis 25A. The lever 26A is hereby turned with its swivel axis 27A about axis 25A. This rotation corresponds to the rotation of shaft 24 in accordance with the first embodiment.

As in the first embodiment, it is also attained here that the spatial orientation of lever 26A or the spatial orientation of lever arm 29 respectively, in accordance with the first embodiment, is always equal to the spatial orientation of lower arm link 2A. In this way, it is possible to balance the weight of the arm links 1A, 2A in every spatial orientation by the force of spring 32 or 32A respectively. Instead of spring 32 or 32A, a hydraulic or pneumatic cylinder, as indicated by dashed lines, can be used.

With the embodiment shown in FIG. 5, the arm links 1A, 2A consist of half shells, into which a human arm can be inserted in order to program the robot arm.

I claim:

1. A robot arm formed of several links, hinges interconnecting said links to form joints, an actuating mechanism comprised of a universal joint connecting an upper link, the latter forming an upper arm link, to a support structure, a uniaxial joint connecting the upper arm link to a lower link, the latter forming a lower arm link, an extendable lever, the lever being pivoted and rotatable about a swivel axis to a part of the swivel joint connected to the universal joint, the swivel axis of the lever being rotatable about an axis which extends perpendicularly to said swivel axis and parallel to the longitudinal axis of the upper arm link, and the swivel axis being rotated about this axis when the part of the swivel joint which is connected to the lower arm link is turned, whereby the swivel axis is maintained parallel to the axis of the uniaxial joint in every swivel position, and a toothed rack movable along the upper arm link and being engaged with a gear ring segment which, together with the lower arm link, can be rotated about the axis of the uniaxial joint, the lever being rotatable about a swivel axis by means of said rack.

2. A robot arm as defined in claim 1, including a gear wheel, a shaft supporting the lever and carrying the gear wheel, whereby the gear wheel cannot be turned yet is axially slidable, the gear wheel being movable by said rack, the shaft supporting an additional swivel lever whose additional swivel axis is parallel to the swivel axis of the lever, the lever and the swivel lever being connected by a cable and the gear wheel being adjacent to the additional swivel lever.

3. A robot arm as defined in claim 2, in which the shaft is mounted on the part of the upper arm link which is connected to the universal joint, the gear wheel being engaged with a pinion mounted on said part of the upper arm link, which, in turn, is engaged with a gear wheel segment, which is arranged on a further part of the upper arm link and the gear wheel, the pinion and the gear wheel segment together being slidable parallel to the axis of the upper arm link by means of the toothed rack.

4. A robot arm formed of several links, hinges interconnecting said links to form joints, an actuating mechanism comprised of a universal joint connecting an upper link, the latter forming an upper arm link, to a support link, the latter forming a lower arm link, an extendable lever hinged to a part of the upper arm link which is connected to the universal joint having a first and another lever arm, the first lever arm pointing in the direction of the lower arm link when the longitudinal axes of the upper and lower arm links are in alignment with one another, means for applying an upwardly directed force on the first lever arm, the lower arm link being connected to said another lever arm whereby the lever is turned by the lower arm link thereby turning said first lever arm in the direction of the universal joint, and a cable line, which extends upwardly, acting on the first lever arm.

5. A robot arm as defined in claim 4, including a gear wheel, a shaft supporting the lever and carrying the gear wheel, whereby the gear wheel cannot be turned yet is axially slidable, the gear wheel being movable by said rack, the shaft supporting an additional swivel lever whose additional swivel axis is parallel to the swivel axis of the lever, the lever and the additional swivel lever being connected by a cable and the gear wheel being adjacent to the additional swivel lever.

6. A robot arm as defined in claim 5, in which the gear wheel, whose shaft is mounted on the part of the upper arm link, which is connected to the universal joint, is engaged with a pinion mounted on said part of the upper arm link, which, in turn, is engaged with a gear wheel segment, which is arranged on a further part of the upper arm link and the gear wheel, the pinion and the gear wheel segment together being slidable parallel to the axis of the upper arm link by means of the toothed rack.

7. A robot arm as defined in claim 4, further including a spring fastened to the structure and connected to the cable line.

8. A robot arm as defined in claim 7, including a gear wheel, a shaft supporting the lever, and carrying the gear wheel, whereby the gear wheel cannot be turned yet is axially slidable, the gear wheel being movable by said rack, the shaft supporting an additional swivel lever whose additional swivel axis is parallel to the swivel axis of the lever, the lever and the additional swivel lever being connected by a cable and the gear wheel being adjacent to the additional swivel lever.

9. A robot arm as defined in claim 8, in which the gear wheel, whose shaft is mounted on the part of the upper arm link, which is connected to the universal joint, is engaged with a pinion mounted on said part of the upper arm link, which, in turn, is engaged with a gear wheel segment, which is arranged on a further part of the upper arm link and the gear wheel, the pinion and the gear wheel segment together being slidable parallel to the axis of the upper arm link by means of the toothed rack.

10. A robot arm formed of several links, hinges interconnecting said links to form joints, an actuating mechanism comprised of a universal joint connecting an upper link, the latter forming an upper arm link, to a support structure, a uniaxial joint connecting the upper arm link to a lower link, the latter forming a lower arm link, an extendable lever hinged to a part of the upper arm link which is connected to the universal joint having a first and another lever arm, the first lever arm pointing in the direction of the lower arm link when the longitudinal axes of the upper and lower arm links are in alignment with one another, means for applying an upwardly directed force on the first lever arm, the lower arm link being connected to said another lever arm whereby the lever is turned by the lower arm link in the event the lower arm link is turned out of its alignment with the upper arm link, thereby turning said first lever arm in the direction of the universal joint, and a pressure cylinder for exerting a tension on the first lever arm, arranged between the first lever arm and the support structure.

11. A robot arm as defined in claim 10, including a gear wheel, a shaft supporting the lever and carrying the gear wheel, whereby the gear wheel cannot be turned yet is axially slidable, the gear wheel being movable by said rack, the shaft supporting an additional swivel lever whose additional swivel axis is parallel to the swivel axis of the lever, the lever and the additional swivel lever being connected by a cable and the gear wheel being adjacent to the additional swivel lever.

12. A robot arm as defined in claim 11, in which the gear wheel, whose shaft is mounted on the part of the upper arm link, which is connected to the universal joint, is engaged with a pinion mounted on said part of the upper arm link, which, in turn, is engaged with a gear wheel segment, which is arranged on a further part of the upper arm link and the gear wheel, the pinion and the gear wheel segment together being slidable parallel to the axis of the upper arm link by means of the toothed rack.

13. A robot arm formed of several links, hinges interconnecting said link to form joints, an actuating mechanism comprised of a universal joint connecting an upper link, the latter forming an upper arm link, to a support structure, a uniaxial joint connecting the upper arm link to a lower link, the latter forming a lower arm link, an extendable lever hinged to a part of the upper arm link which is connected to the universal joint, the lever being pivoted and rotatable about a swivel axis to a part of the swivel joint connected to the universal joint, the swivel axis of the lever being rotatable about an axis which extends perpendicularly to said swivel axis and parallel to the longitudinal axis of the upper arm link, and the swivel axis being rotated about this axis when the part of the swivel joint which is connected to the lower link is turned, whereby the swivel axis is maintained parallel to the axis of the uniaxial joint in every swivel position, a shaft supporting the lever, the axis of the shaft being at right angles to the axis of the uniaxial joint, and a toothed rack movable along the upper arm link and being engaged with a gear ring segment which, together with the lower arm link, can be rotated about the axis of the uniaxial joint, the lever being rotatable about a swivel axis by means of said rack.

14. A robot arm as defined in claim 13 further including a gear unit connecting the shaft to a rotatable part of the upper arm link, the shaft being turned in the same direction and by the same angle with the rotatable part.

15. A robot arm as defined in claim 13, including a gear wheel, carried by the shaft supporting the lever, which cannot be turned yet is axially slidable, the gear wheel being movable by said rack, the shaft supporting an additional swivel lever whose additional swivel axis is parallel to the swivel axis of the lever, the lever and the additional swivel lever being connected by a cable and the gear wheel being adjacent to the additional swivel lever.

16. A robot arm as defined in claim 15, in which the shaft is mounted on the part of the upper arm link which is connected to the universal joint, the gear wheel being engaged with a pinion mounted on said part of the upper arm link, which, in turn, is engaged with a gear wheel segment, which is arranged on a further part of the upper arm link and the gear wheel, the pinion and the gear wheel segment together being slidable parallel to the axis of the upper arm link by means of the toothed rack.

17. A robot arm as defined in claim 14, including a gear wheel, carried by the shaft supporting the lever, which cannot be turned yet is axially slidable, the gear wheel being movable by said rack, the shaft supporting an additional swivel lever whose additional swivel axis is parallel to the swivel axis of the lever, the lever and the additional swivel lever being connected by a cable and the gear wheel being adjacent to the additional swivel lever.

18. A robot arm as defined in claim 17, in which the shaft is mounted on the part of the upper arm link which is connected to the universal joint, the gear wheel being engaged with a pinion mounted on said part of the upper arm link, which, in turn, is engaged with a gear wheel segment, which is arranged on a further part of the upper arm link and the gear wheel, the pinion and the gear wheel segment together being slidable parallel to the axis of the upper arm link by means of the toothed rack.

* * * * *